United States Patent [19]
Abowd et al.

[11] Patent Number: 5,379,637
[45] Date of Patent: Jan. 10, 1995

[54] NATURAL GAS VEHICLE FUEL GAUGE SYSTEM

[75] Inventors: Michael J. Abowd, Ann Arbor, Mich.; Pierre Y. Abboud; James R. Ray, both of Cortland, Ohio

[73] Assignee: General Motors Corporation, Detroit, Mich.

[21] Appl. No.: 133,940

[22] Filed: Oct. 12, 1993

[51] Int. Cl.⁶ .................... G01F 23/18; G01F 23/22; G01F 25/00
[52] U.S. Cl. ...................... 73/290 R; 73/149; 73/295; 73/299; 73/1 H
[58] Field of Search .............. 73/290 R, 295, 299, 73/149, 1 H, 866.3

[56] References Cited
U.S. PATENT DOCUMENTS

| | | | |
|---|---|---|---|
| 3,411,351 | 11/1968 | Schwartz | 73/149 |
| 3,789,820 | 2/1974 | Douglas et al. | 123/526 |
| 4,408,484 | 10/1983 | Erickson | 73/149 |
| 4,450,721 | 5/1984 | Gaunt et al. | 73/290 R |
| 4,523,548 | 6/1985 | Engel et al. | 123/1 A |
| 4,531,497 | 7/1985 | Smith | 123/575 |
| 4,984,457 | 1/1991 | Morris | 73/149 |
| 4,987,932 | 1/1991 | Pierson | 62/50.1 |
| 5,259,424 | 11/1993 | Miller et al. | 73/149 |

*Primary Examiner*—Diego F. F. Gutierrez
*Attorney, Agent, or Firm*—Anthony L. Simon

[57] ABSTRACT

A method of measuring and indicating a level of natural gas fuel in a storage tank of a motor vehicle, comprising the steps of determining a temperature of the natural gas, determining a pressure of the natural gas, retrieving from a look-up table, responsive to the determined temperature and pressure, a signal representative of a percentage that the tank is full of the natural gas, determining a gauge command responsive to the signal, and driving the gauge according to the determined command.

3 Claims, 5 Drawing Sheets

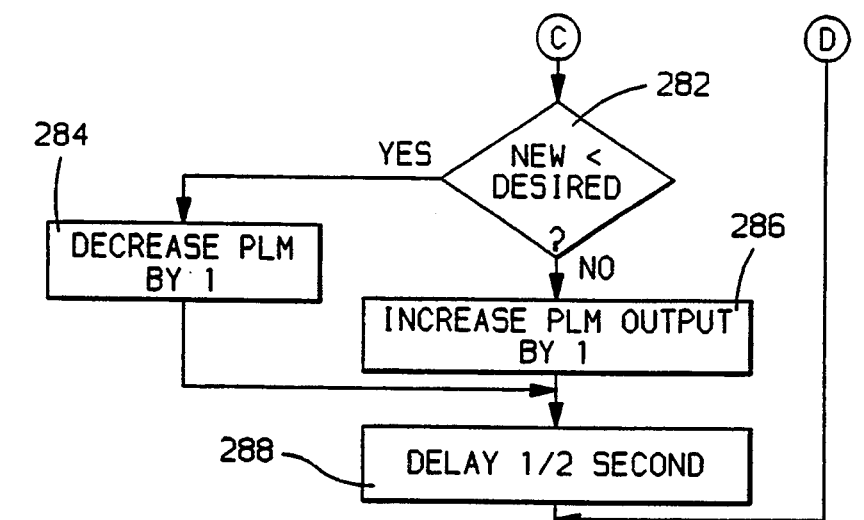
FIG. 3C
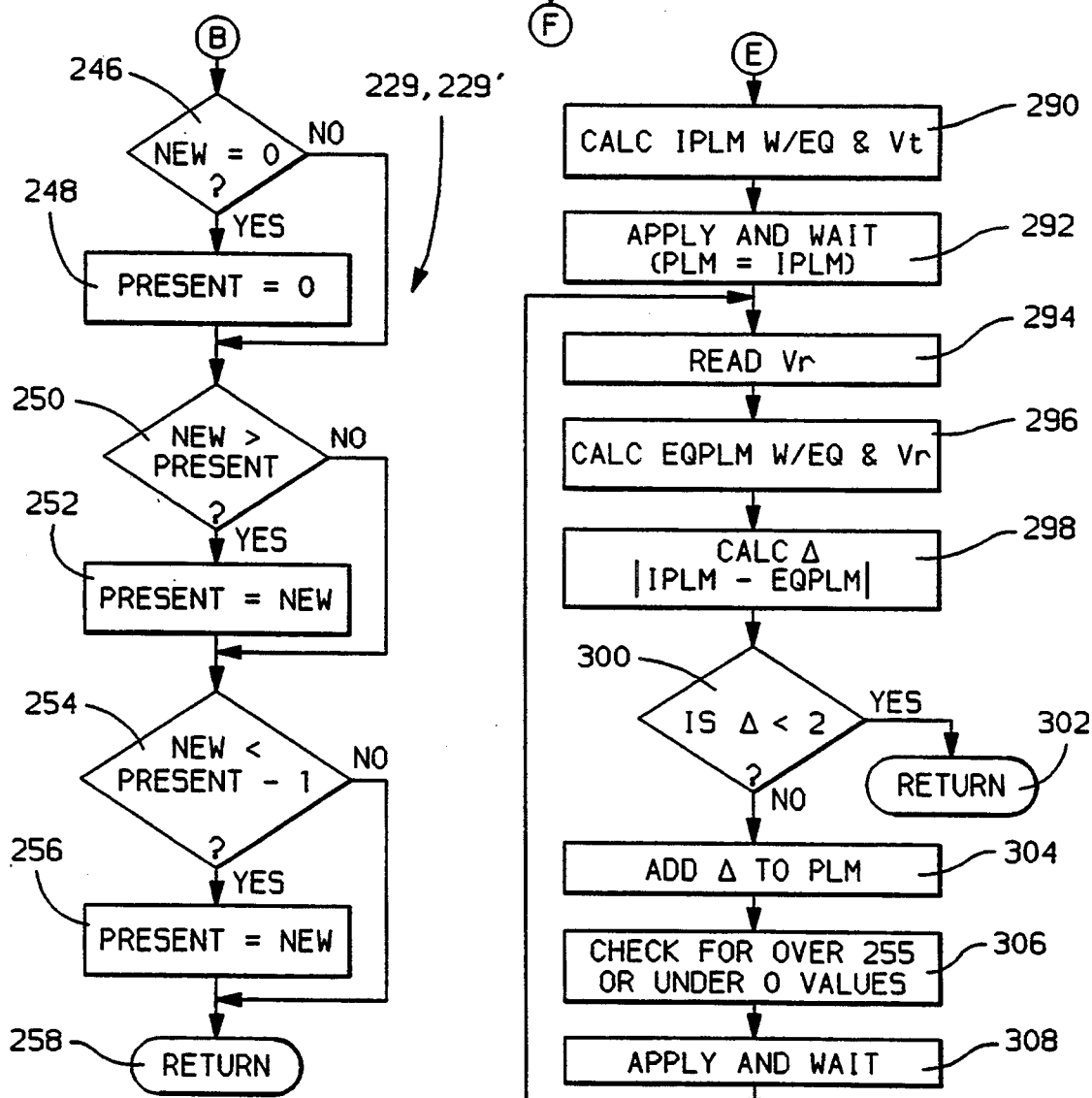
FIG. 3D
FIG. 3E

NATURAL GAS VEHICLE FUEL GAUGE SYSTEM

This invention relates to a fuel level measurement system for a vehicle powered by natural gas.

BACKGROUND OF THE INVENTION

In the search for alternative fuel vehicles, natural gas is one consideration as an alternative fuel. In a vehicle powered by natural gas, just as in gasoline powered vehicles, a vehicle operator should be able to read from a fuel gauge a measure of fuel in the vehicle to obtain an accurate representation of the remaining energy content (i.e., driving range) of the vehicle.

SUMMARY OF THE PRESENT INVENTION

Advantageously, this invention provides, for a natural gas fueled vehicle, a fuel measurement and gauge system that provides the operator with a gauge reading indicative of the measure of fuel in the vehicle. Advantageously, this invention provides a gauge driver for a natural gas vehicle that provides pressure sensor, temperature sensor and low fuel telltale hysteresis. Advantageously, this invention provides a gauge driver for a natural gas fueled vehicle that provides closed loop gauge control.

Advantageously, this invention provides a gauge driver for a natural gas vehicle that automatically calibrates to the characteristics of the air core gauge being used.

Advantageously, in a motor vehicle fueled by natural gas and having a tank for storing a natural gas fuel, this invention comprises means for determining a pressure of the natural gas fuel in the tank, means for determining a temperature of the natural gas fuel in the tank, means responsive to the pressure and temperature determinations for retrieving from a look-up table a first signal indicative of a percentage that the tank is full of the natural gas, means for developing a command responsive to the retrieved first signal, and means for applying the command to a gauge to indicate the amount of natural gas fuel in the tank.

Advantageously, the method of this invention for measuring and indicating a level of natural gas fuel in a storage tank of a motor vehicle comprises the steps of (i) determining a temperature of the natural gas, (ii) determining a pressure of the natural gas, (iii) retrieving from a look-up table, responsive to the determined temperature and pressure, a signal representative of a percentage that the tank is full of the natural gas, (iv) determining a gauge command responsive to the signal (v) and driving the gauge according to the determined command.

A more detailed description of this invention is set forth below.

BRIEF DESCRIPTION OF THE DRAWINGS

FIGS. 3a, 3b, 3c, 3d, 3e and 4 comprise flow diagrams of a control routine according to this invention run by the microprocessor controller shown in FIG. 2.

DETAILED DESCRIPTION OF THE INVENTION

Figure 1:
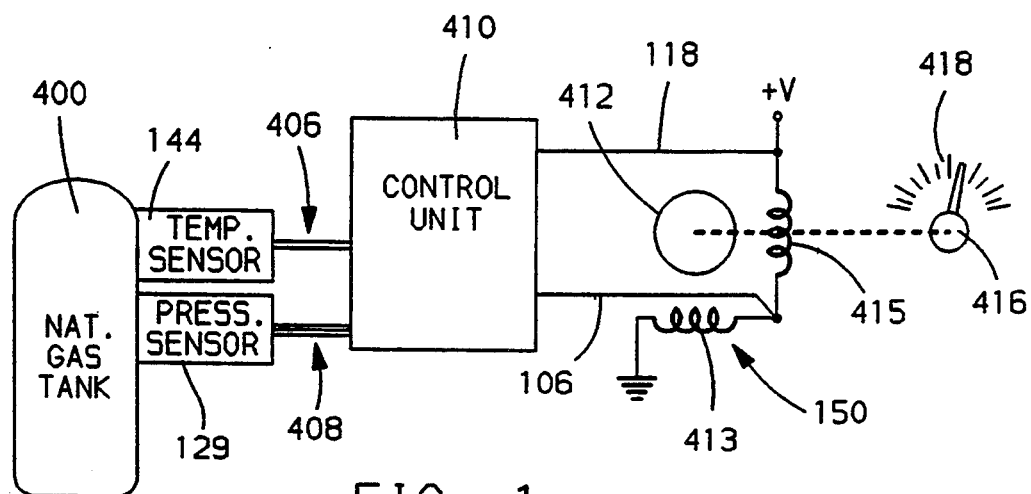
FIG. 1 illustrates a fuel measurement and gauge system according to this invention.

FIG. 1 illustrates a natural gas fuel measurement indication system according to this invention. A vessel (tank) 400 mounted on a vehicle (not shown) contains natural gas used to fuel the vehicle. A pressure sensor 129 is coupled to control unit 410 by three lines 408 (i.e., a 5 volt line, a data line and a ground line) and provides an output signal on the data line indicative of the internal pressure of vessel 400 provided by the natural gas fuel in the vessel. Pressure sensor 129, for example, provides a 0.25 to 4.75 volt output as the sensed pressure varies from a minimum, approximately 0 psi, to a maximum 5000 psi. Suitable pressure sensors are available from Data Instruments Inc., Acton, Mass. (i.e., Model No. 0–5000 psi)and are easily implemented by one skilled in the art.

A temperature sensor 144 is coupled to control unit 410 via two lines 406 (a 12 volt send line and a return-/data line) and provides a signal on the data line indicative of the temperature of the natural gas in the vessel 400. Temperature sensor 144 is of a variable resistance type well known and readily available to those skilled in the art.

Control unit 410, responsive to the pressure and temperature signals, determines a command for gauge 150 indicative of the amount of fuel in vessel 400. The command is provided via line 106 to gauge 150.

Gauge 150 is of a type well known to those skilled in the art commonly referred to as a two coil air core gauge. The two coil air core gauge contains coils 413 and 415 wound substantially perpendicular to each other on a bobbin (not shown) around a rotatable magnetic rotor 412. As current is provided to the two coils of the air core gauge 50, the two coils create a composite magnetic vector having a direction to which the magnetic rotor 412 rotates to align itself. A spindle (not shown) is attached to the rotor and rotates with the rotor. Pointer 412 is staked to the spindle, in a manner well known to those skilled in the art, and rotates with the spindle and rotor 412 to indicate, together with display graphics 418, a measure of fuel in the vessel 400. The gauge indication is representative of the percentage that the tank is full of natural gas, i.e., F (Full), ½ (50% full), E (empty), etc..

The command on line 106 varies the voltage at the junction of coils 413 and 415, varying the ratio of the voltages across coils 413 arid 415. In response to the changing voltage ratio across coils 413 and 415, current through the coils changes, changing the magnitudes of the magnetic fields created by the two coils and the direction of the resultant composite magnetic vector to which the rotor 412 rotates (rotating the spindle and pointer) to align itself.

Lines 118 and 106 provide feedback of the actual voltages across the coils of the gauge 150 for closed loop control of gauge 150 in the manner described below.

Figure 2:
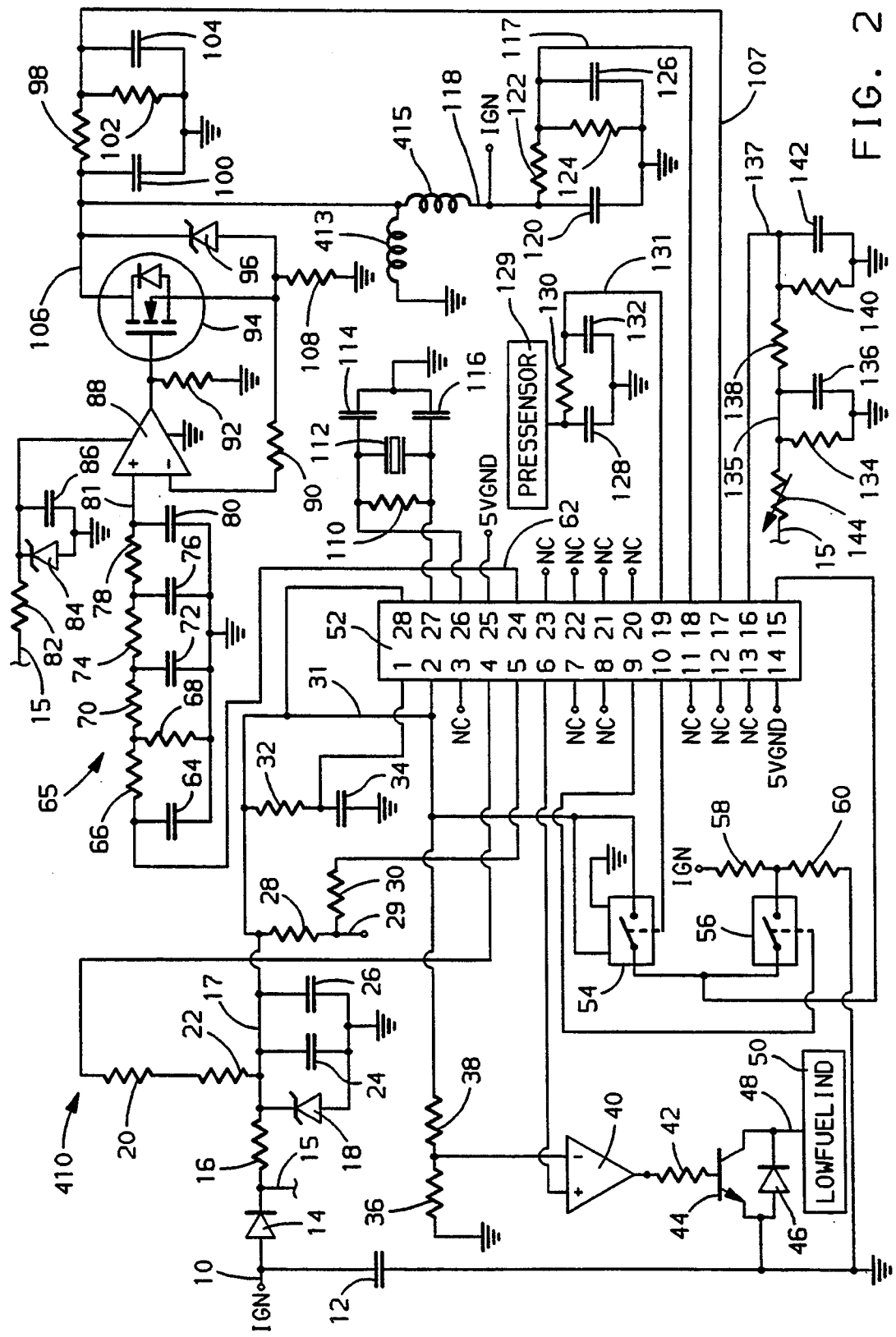
FIG. 2 is a schematic illustration of a gauge control circuit according to this invention.

Referring to FIG. 2, the gauge driver according to this invention is microprocessor-based using microprocessor 52 and is designed to be adaptable to any two coil air core gauge, such as air core gauge 150. The driver circuit includes diode 14 and resistor 16 through which it receives power from power line 10, coupled to the vehicle ignition voltage. Diode 14 provides reverse voltage protection and resistor 16 provides high voltage protection. Zener diode 18 clamps line 17 to a fixed 5-volt level, providing a regulated power supply to microprocessor 52. Capacitors 24 and 26 attenuate high frequency fluctuations that may be passed from the vehicle ignition power line and stabilize line 17.

Resistors 28 and 30 bias the mode select input of microprocessor 52 high. The mode select input may be brought low by applying a signal on line 29. The mode select function will be described in further detail below.

Capacitor 34 and resistor 32 control the reset bar input to microprocessor 52, maintaining, during vehicle ignition on, microprocessor 52 in reset until line 17 stabilizes. Microprocessor 52 runs a control routine stored in memory at a frequency controlled by the clock circuit comprising resistor 110, ceramic resonator 112 and capacitors 114 and 116, as shown. In general, the microprocessor 52 may be any standard microprocessor such as an MC68HCO5P9 microprocessor available from Motorola.

Microprocessor 52 is responsive to signals received from temperature sensor 144, pressure sensor 129 and air core gauge 150. Temperature sensor 144 has an impedance that varies with the temperature of the natural gas fuel in the fuel tank 400 (FIG. 1). Temperature sensor 144 and resistor 134 comprise a voltage divider that provides a signal on line 135 that varies with the temperature of the natural gas fuel. Capacitor 136 filters high frequency components of the signal on line 135. Resistors 138 and 140 comprise another voltage divider that brings the signal on line 135 down to a range that microprocessor 52 can read in its analog input port, pin 16, that is controllably coupled to the internal A/D converter of microprocessor 52. Capacitor 142 filters high frequency noise signals from line 137.

A circuit comprising resistor 130 and capacitors 128 and 132 filter the signal from pressure sensor 129 and provide the filtered signal to another of the analog input ports of microprocessor 52, pin 19.

In response to the input pressure and temperature signals indicating the pressure of natural gas in the natural gas fuel tank and the temperature of the natural gas in the natural gas fuel tank, microprocessor 52 determines, in the manner explained in more detail below, a measurement of the amount of energy content (natural gas fuel) in the vehicle fuel tank, which is also indicative of a percentage that the natural gas tank is full. Microprocessor 52 provides an output command on line 62 comprising a pulse width modulated signal having a pulse length corresponding to the percentage that the fuel tank is full of fuel. The PWM signal is controlled by a pulse length command provided by microprocessor 52 having a value corresponding to the length of the on time of the PWM signal. For example, in an eight bit system, a pulse length command having a value of zero corresponds to a zero duty cycle PWM command. A pulse length command having a value of 255 corresponds to a 100 percent duty cycle PWM command. The circuit designated generally by the reference 65 converts the PWM signal to a voltage signal and uses the voltage signal to drive an air core gauge.

More particularly, resistors 66, 70, 74 and 78 and capacitors 64, 68, 72, 76 and 80 convert the PWM signal to a voltage signal on line 81. The voltage signal is input to the non-inverting input of amplifier 88. Amplifier 88 is biased between ground and line 15 with resistor 82 and capacitor 86 providing high frequency attenuation. Diode 84 clamps the bias input to a predetermined level. Amplifier 88 provides an output to the gate of MOSFET 94, which gate is normally biased to ground via resistor 92. MOSFET 94 acts as a current source controlling the flow of current through resistor 108 to ground, thereby controlling the voltage on line 106 and the voltage at the junction of coils 413 and 415 of gauge 150. Resistor 108 acts as a current sensor that is monitored, via resistor 90, by amplifier 88, thus providing feedback to the inverting input of amplifier 88. Zener diode 96 clamps the voltage across transistor 94 to a predetermined maximum to protect transistor 94.

Closed loop control of gauge 150 is provided by the sensing of the voltage at lines 106 and 118 to determine if the resulting ratio of the coil voltages is substantially equal to the commanded ratio. As explained below, microprocessor 52 adjusts the PLM command in response to the measured and desired ratios.

More particularly, resistors 98 and 102 comprise a voltage divider that provides an output on line 107 that is representative of the level of the signal on line 106, reduced to a level in the range that can be read by microprocessor 52, via its analog input port at pin 17. Capacitors 100 and 104 filter high frequency signal components from lines 106 and 107, respectively.

Resistors 122 and 124 comprise a voltage divider that provides an output on line 117 that is representative of the level of the signal on line 118, reduced to a level in the range that can be read by microprocessor 52 via its analog input port at pin 18. Capacitors 120 and 126 filter high frequency signal components from lines 118 and 117, respectively.

By monitoring the voltages at lines 118 and 106, microprocessor 52 can ascertain the voltage across the two coils of gauge 150 and correct the gauge command so that the ratio of the two voltages across the coils of gauge 150 equals the desired ratio for the amount of fuel determined to be contained in the fuel tank.

When the amount of fuel in the tank is lower than a predetermined low-level threshold, a low fuel command is provided at pin 6 of microprocessor 52 to the non-inverting input of amplifier 40. The inverting input of amplifier 40 is biased by resistors 36 and 38, coupled between the 5-volt regulated power supply line 17 and ground. When the low fuel command appears at pin 6, amplifier 40 provides a high output via resistor 42 to transistor 44, turning transistor 44 on and providing current through line 48 to low fuel tell-tale 50. Zener diode 46 protects transistor 44.

Microprocessor 52 controls the state of transmission gates 54 and 56 to select the proper positive reference voltage for the microprocessor's internal A/D converter. Microprocessor 52 characteristically has only one A/D converter, which is selectively coupled to the input ports at pins 16, 17, 18 and 19 by issuance of a proper input command, enabling microprocessor 52 to selectively read the input signals.

Resistors 134, 138 and 140 are easily set by those skilled in the art so that the signal on line 137, which is representative of the temperature of the natural gas fuel, is in a range between 0 and 5 volts. Likewise, pressure sensor 129 receives power from the 5 volt regulated supply line 31 and provides an output signal in the range between 0 and 5 volts. Thus, when microprocessor 52 reads the temperature and pressure signals input at pins 16 and 19, transmission gate 54 is commanded closed to couple the A/D converter positive reference at pin 15 to the regulated 5 volt supply line 17. While transmission gate 54 is commanded closed, transmission gate 56 is commanded open.

The gauge 150, as shown, is coupled between the vehicle supply voltage, which may fluctuate, and ground. Thus, the signals from line 118 and 106 from gauge 150 may vary with fluctuations in the vehicle supply voltage. Resistors 58 and 60 comprises a voltage divider that provides a reference voltage between 0 and 5 volts that varies with the vehicle supply voltage. When microprocessor 52 reads the voltage signals from gauge 150 at input pins 16 and 17, transmission gate 56 is commanded closed to couple the A/D converter positive reference at pin 15 to the voltage reference set by the voltage divider comprising resistors 58 and 60. While transmission gate 56 is commanded closed, transmission gate 54 is commanded open.

Referring to FIGS. 3a, 3b, 3c, 3d, 3e and 4, an example flow routine implemented according to this invention by microprocessor 52 starts at block 200. At block 202, the system is initialized in a standard manner and at block 204 the system determines if it is in calibration mode. Calibration through blocks 206, 208 and 212 is performed with the system in a controlled environment of known pressure and temperature. An operator provides a signal, grounding one of the microprocessor inputs (i.e., line 29, FIG. 2), in response to which a calibration mode flag is set. If the calibration mode flag is set, the routine moves to block 206 and reads the temperature and pressure sensor inputs. Block 208 compares the temperature and pressure inputs to the known pressure and temperature of the controlled environment.

Block 212 calculates pressure and temperature adjust factors, PAF and TAF. The pressure adjust factor is determined as follows:

$$PAF = Pa/Pr,$$

where Pa is the known pressure of the controlled environment and Pr is the pressure signal read from the pressure sensor. The temperature adjust factor is determined as follows:

$$TAF = Ta/Tr,$$

where Ta is the known pressure of the controlled environment and Tr is the pressure signal read from the pressure sensor. The temperature and pressure adjust factors, TAF and PAF, are then stored in memory and used to compensate for gain variations that may occur from sensor to sensor. If the calibration flag is not set, the system moves through blocks 213 and 214 where the pressure and temperature adjust factors are nominally set to 100 percent or to the values determined during a previous run of the test routine.

The routine then moves to block 216 where it determines if it is in calibrate gauge mode. The calibrate gauge mode is selected at each start-up and is run once for each ignition cycle of the vehicle, controlled by a calibrate gauge flag set at each initialization of microprocessor 52. At block 216 if the calibrate gauge flag has not been reset, the routine moves to block 218 where the gauge calibration begins and performs the functions and steps of: driving the gauge according to a predetermined test command; sensing an actual gauge voltage when the predetermined test command is driving the gauge; and determining an adjust factor signal representative of the gauge's characteristics responsive to the sensed actual gauge voltage. Thus, when the gauge command is developed, it is preferably responsive to the adjust factor signal, taking into account the gauge's characteristics.

More particularly, at block 218, microprocessor 52 (FIG. 2) sends, as a predetermined test command, the full-on signal to the gauge and, after the gauge is set to fullon, a delay is cycled to allow the gauge to stabilize. The routine then reads the voltage across the gauge coils by reading the voltage from line 106 and from line 118 in FIG. 2. Ground is assumed to be zero.

At block 220, the ratio, V %, of the coil voltages is determined as:

$$V\% = V_{106}/V_{118},$$

where $V_{118}$ is the voltage between line 118 and ground (as read by the signal on line 117) and $V_{106}$ is the voltage between line 106 and ground (as read from line 107). At block 222, an adjust factor for the gauge is determined equal to the actual ratio determined at block 220 divided by a predetermined desired ratio, a typical maximum gauge voltage ratio. The adjust factor for the gauge is a signal representing the gauge characteristics, such as coil impedances, which may change as the gauge ages. Thus, according to this invention, the system automatically recalibrates itself to the actual gauge characteristics, accounting for gauge aging and, in the event of replacement of a gauge, for the characteristics of the replacement gauge.

Block 222 completes the gate calibration portion of the routine and the calibrate gauge flag is then reset. At block 224, the gauge is initialized by providing a 50 percent duty cycle on the pulse-width modulated signal on line 62, FIG. 1. This helps to provide a jump-start to the actual desired gauge position representing actual fuel in the vehicle.

The routine then transitions from the initialization by performing the steps and functions of: (a) determining the temperature of the natural gas in the tank; (b) determining the pressure of the natural gas in the tank; (c) responsive to the determined temperature and pressure, retrieving from the look-up table the signal representative of the desired voltage ratio; (d) determining a gauge command responsive to the desired voltage ratio; (e) applying the gauge command to the gauge; (f) determining an actual voltage ratio of the gauge; (g) determining a comparison command responsive to the actual voltage ratio; (h) determining a difference between the gauge command and the comparison command; and, (i) if the difference is greater than a predetermined threshold, updating the gauge command in response to the difference and repeating steps (e)–(h), to bring the gauge to an approximate reading of the amount of fuel in the tank.

After the gauge is brought to an approximate reading of the amount of fuel in the tank, the gauge is brought to an accurate indication of the measure of natural gas fuel in the tank according to the steps and functions of: determining a temperature of the natural gas; determining a pressure of the natural gas; retrieving from a look-up table, responsive to the determined temperature and pressure, a signal representative of a desired voltage ratio of a first voltage across a first coil and a second voltage across a second coil of the two coil air core gauge; developing a command responsive to the desired voltage ratio; driving the two coil air core gauge according to the developed command; measuring the actual voltage ratio of the first and second coils of the two coil air core gauge; and correcting the developed command (by incremental adjustments) responsive to the measured actual voltage ratio so that the actual voltage ratio substantially equals the desired voltage ratio.

More particularly, the routine moves to block 226. At block 226, the temperature sensor input is read by the A/D converter to microprocessor 52. At block 228, the read temperature signal is multiplied by the temperature adjust factor, TAF. The routine then moves to block 229, where the temperature sensor signal is then processed by the hysteresis subroutine shown in more detail in FIG. 3d.

Referring to FIG. 3d, if the new temperature sensor signal is equal to zero, the present temperature measurement is set to zero at block 248. At block 250, if the new temperature sensor signal is greater than the present temperature sensor signal in memory, the routine moves to block 252, where the present temperature signal is set equal to the new temperature signal. At block 254, if the new temperature signal is less than the present temperature signal in memory minus 1, the present temperature signal is set equal to the new temperature signal at block 256. Otherwise, the present temperature signal is not updated in memory. This gives the effect of allowing the present value of the sensor reading to equal the newly read value only when the new value is greater than the present or when the new is less than the present less one unit. This hysteresis effect filters the newly read values and allows relatively smooth data to pass. The hysteresis subroutine is exited at block 258.

At block 230, the system reads the pressure sensor signal. At block 232, the present pressure sensor signal is multiplied by the pressure adjust factor and the routine moves to block 229', where a routine similar to that shown in FIG. 3d is run for the pressure sensor signal.

At block 234, the resultant adjusted pressure and temperature signals are used as inputs to a look-up table to determine a desired voltage ratio for the two coils of the air core gauge (i.e. desired voltage ratio equals desired voltage of first coil divided by voltage of second coil). The desired voltage ratio may correspond to the amount of fuel in the fuel tank and represents the fuel measurement signal indicative of the percentage that the tank is full of natural gas. The typical fuel gauge is driven over 45 degrees of angular movement where equal voltage on both coils corresponds to a full reading of the gauge. At block 236, a subroutine for controlling the low fuel tell-tale is run. This subroutine is shown in more detail in FIG. 4.

Figure 4:
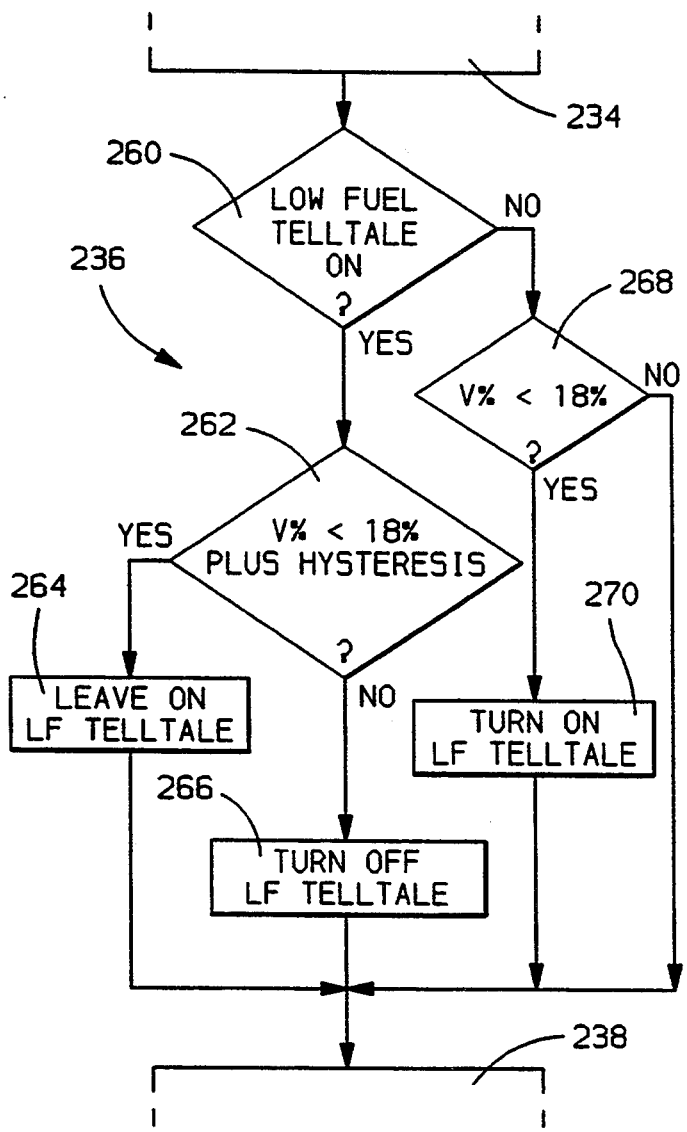

Referring now to FIG. 4, at block 260, if the low fuel tell-tale is not currently on (as indicated by a telltale control flag), the routine moves to block 268 where the desired voltage ratio is compared to a predetermined value, for example, 18 percent. If the desired voltage ratio is less than 18 percent, the low fuel tell-tale is turned on at block 270. If not, the low fuel tell-tale is left off and the routine is exited at block 274. If at block 260 the low fuel tell-tale is on, hysteresis is provided in the routine to prevent flickering. At block 262, the desired voltage ratio is compared to 18 percent plus a hysteresis value. If the percent voltage is less than 18 percent plus the hysteresis value, block 264 leaves the tell-tale on. If the voltage is greater than 18 percent plus the hysteresis value, block 266 turns off the low fuel tell-tale. This gives the effect of keeping the tell-tale on until there is a reading of greater than approximately 21%. This prevents the tell-tale from cycling on then off when the reading is close to 18%.

Referring again to FIG. 3b, at block 238, the desired voltage ratio is multiplied by the adjust factor, adjusting the desired voltage ratio to the gauge characteristics as determined at blocks 218-222. At block 240, the routine checks an initialization flag to determine if this is the first time through the step at block 240 for this engine ignition cycle. If yes, the routine moves to the initial guess routine shown in FIG. 3e. The initial routine provides quick cycling of the gauge to move the pointer to the vicinity of the position indicating the amount of fuel in the fuel vessel. This initial routine is cycled and the remainder of the control routine is then cycled to provide closed loop control of the gauge signal to more closely control position of the gauge.

Figure 3A:
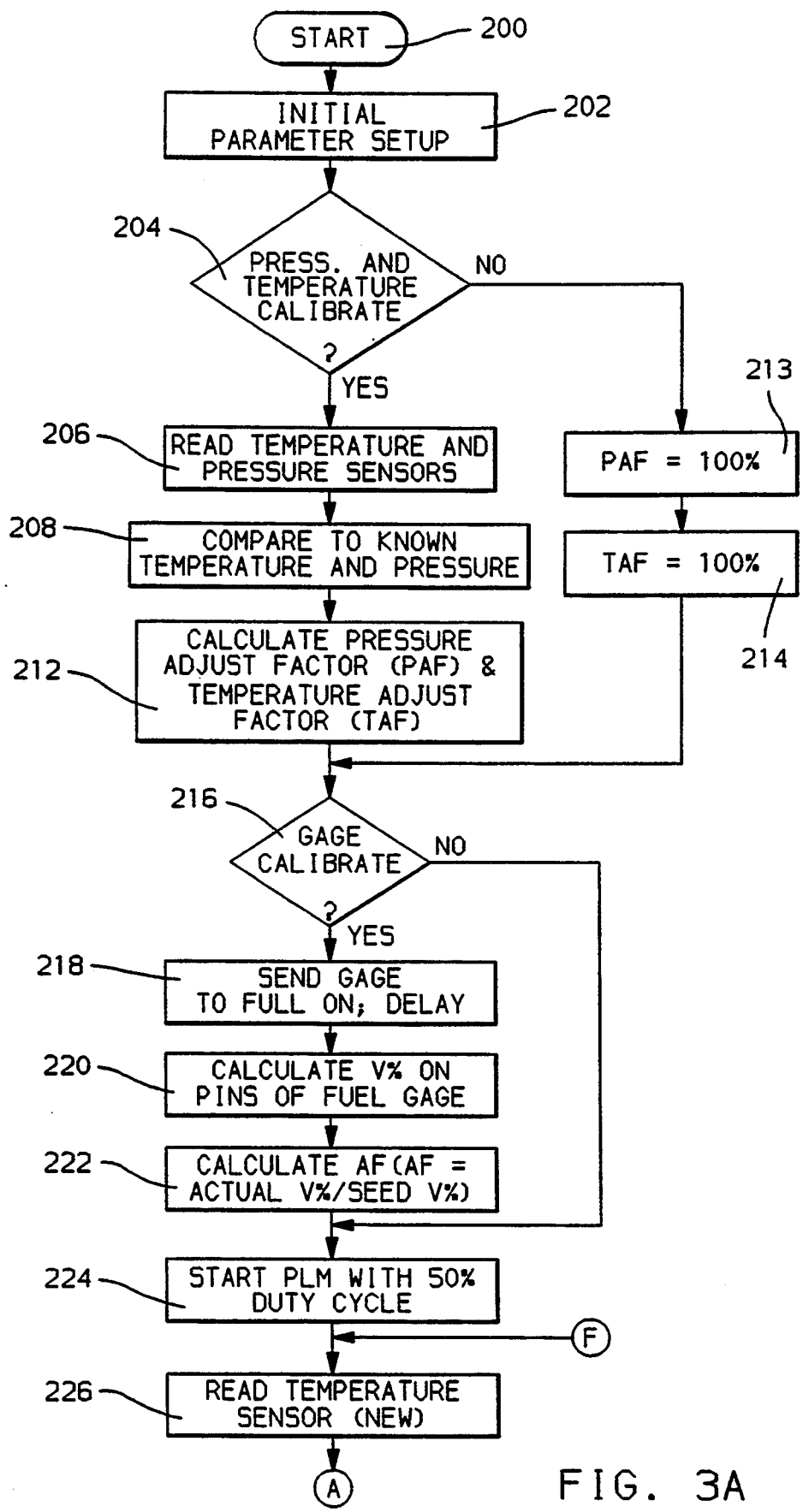
Figure 3B:
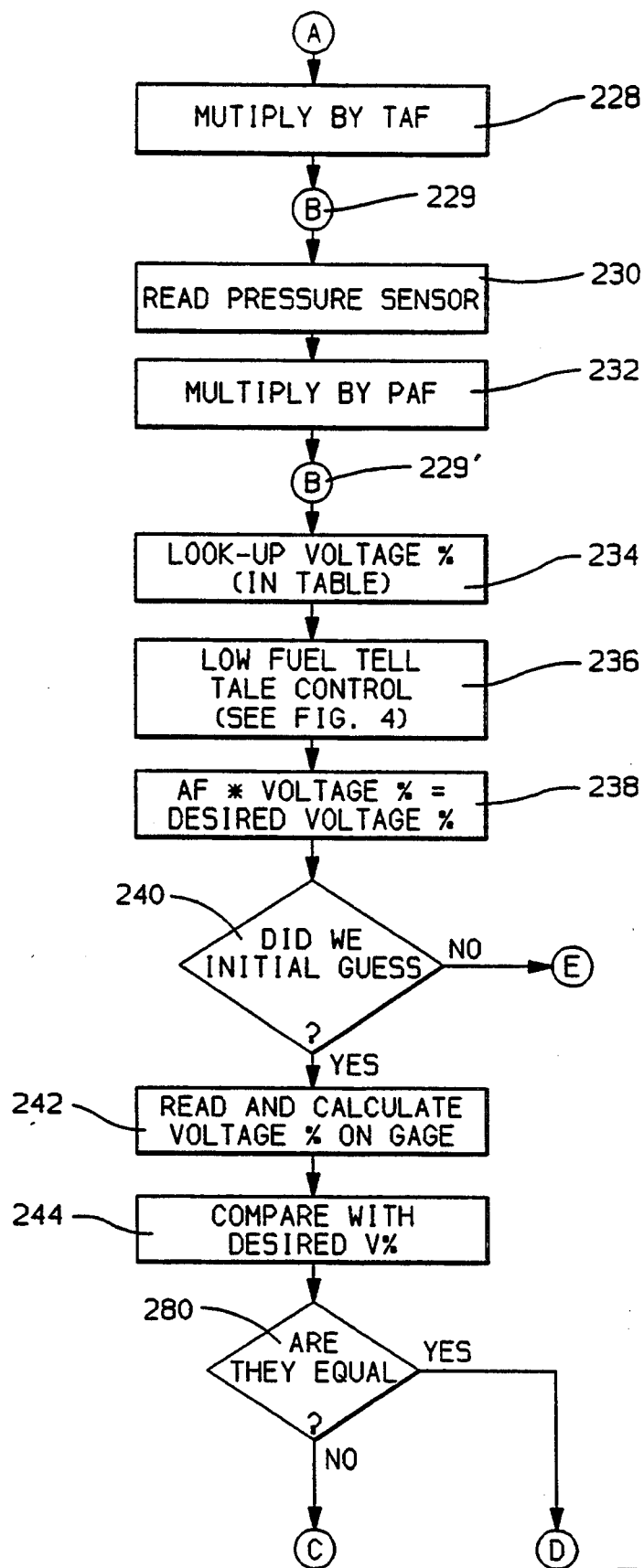

The routine in FIG. 3e is faster and less precise and therefore useful for initialization. The routine in FIGS. 3a, 3b and 3c provides higher precision but is slower and therefore is more useful after the gauge has been initialized. Implementing the routine in FIG. 3e prevents a long initialization cycle of the gauge.

Referring to FIG. 3e, block 290 calculates an initial PLM command, IPLM, responsive to the desired voltage ratio according to the equation:

$$IPLM = B((57(125-(172*V\%))/(100+V\%))/5828), \quad (A)$$

where B is the system voltage ratio, which may be obtained by referencing the microcomputer's analog to digital converter between the 5 volt regulated supply line 31 and ground, coupling line 117 to the input of the A/D converter, and reading the A/D converter output.

At block 292, the command PLM is set equal to the value of IPLM and is output on line 62 and applied to the gauge 150. The routine then pauses while the gauge 150 stabilized. At block 294, the voltages at lines 106 and 118 are again input to microprocessor 52 and microprocessor 52 again calculates the actual voltage ratio, V % as described above.

At block 296, the routine determines a value for a comparison command, EQPLM, according to equation (A) above, using the new value for V %. At block 298, the difference between the gauge command and the comparison command, a value: delta=IPLM−EQPLM, is determined. Block 300 compares delta to a predetermined threshold value, i.e., 2. If delta is less than the predetermined threshold value at block 300, the gauge is fully initialized and the initial guess routine is ended at block 302, returning the system to block 242 in FIG. 3b. If delta is not less than the predetermined threshold value at block 300, the routine moves to block 304 where delta is added to the command PLM. At block 306, PLM is limited to a maximum of 255 and a minimum of 0 and at block 308, the updated command PLM is output on line 62 and applied to gauge 150. The routine then pauses so that the gauge may stabilize and then returns to block 294.

Returning to FIGS. 3b and 3c, block 242 reads the voltage values from the air core gauge and calculates the actual voltage ratio. The actual voltage ratio is compared with the desired voltage ratio at blocks 244 and 280. If the actual voltage ratio is equal to the desired voltage ratio, the routine returns to block 226 in FIG. 3a. If the actual voltage ratio is less than the desired voltage ratio, the pulse-width modulation command is decreased at block 286 by a predetermined value, i.e., one unit. Otherwise, block 284 increases the PLM output value by the predetermined value. Block 288 provides a delay of one-half second for stabilization and the routine loops back to block 226 in FIG. 3a.

In this manner, blocks 242-244 and 280-288 provide closed loop control of the gauge position, based on comparison of the actual gauge voltage ratio to a desired gauge voltage ratio.

In the above manner, this invention provides a natural gas vehicle fuel measurement system that enables a driver of a natural gas vehicle to read a gauge indication of the amount of fuel in the vehicle. The apparatus described above reads temperature and pressure signals from sensors in a natural gas fuel tank and determines a command indicative of the percentage that the vehicle fuel tank is full of natural gas fuel. The apparatus above is adaptive to changing gauge characteristics such as those due to aging and provides closed loop control of the gauge.

Moreover, various other improvements and modifications to this invention may occur to those skilled in the an and such improvements and modifications will fall within the scope of this invention as set forth below.

The embodiments of the invention to which an exclusive property of privilege is claimed are defined as follows:

1. A method of measuring and indicating, with a two coil air core gauge, a level of natural gas fuel in a storage tank of a motor vehicle, comprising the steps of:

determining a temperature of the natural gas;
   determining a pressure of the natural gas;
   retrieving from a look-up table, responsive to the determined temperature and pressure, a signal representative of a desired voltage ratio of a first voltage across a first coil and a second voltage across a second coil of the two coil air core gauge;
   developing a command responsive to the desired voltage ratio;
   driving the two coil air core gauge according to the developed command to indicate the level of natural gas in the tank;
   measuring the actual voltage ratio of the first and second coils of the two coil air core gauge; and
   correcting the developed command using the measured actual voltage ratio so that the actual voltage ratio substantially equals the desired voltage ratio.

2. The method of claim 1, also comprising the steps of:

driving the gauge according to a predetermined test command;
   measuring the actual voltage ratio when the gauge is driven with the predetermined test command;
   comparing the actual voltage ratio when the gauge is driven with the predetermined test command with a predetermined nominal voltage ratio;
   developing an adjust factor responsive to the comparison; wherein,
   the command is developed also in response to the adjust factor.

3. The method of claim 1, also comprising an initial step, including the substeps of:

(a) determining an initial temperature of the natural gas;
   (b) determining an initial pressure of the natural gas;
   (c) retrieving from the look-up table, responsive to the determined initial temperature and initial pressure, a signal representative of an initial desired voltage ratio;
   (d) determining an initial gauge command responsive to the initial desired voltage ratio;
   (e) applying the initial gauge command to the gauge;
   (f) determining an initial actual voltage ratio of the gauge;
   (g) determining a comparison command responsive to the initial actual voltage ratio;
   (h) determining a difference between the initial gauge command and the comparison command; and
   (i) if the difference is greater than a predetermined threshold, updating the initial gauge command in response to the difference and repeating steps (e)-(h), thereby initializing the gauge to an approximate reading of the amount of fuel in the tank.

* * * * *